United States Patent [19]

Hasegawa et al.

[11] Patent Number: 4,881,141
[45] Date of Patent: Nov. 14, 1989

[54] DRIVING APPARATUS FOR A MAGNETIC HEAD

[75] Inventors: Saburo Hasegawa, Hanamaki; Eiji Minai, Sagamihara, both of Japan

[73] Assignee: Matsushita Electric Industrial Co., Ltd., Kadoma, Japan

[21] Appl. No.: 191,968

[22] Filed: May 9, 1988

Related U.S. Application Data

[62] Division of Ser. No. 733,910, May 14, 1985.

[30] Foreign Application Priority Data

| May 15, 1984 | [JP] | Japan | 59-96877 |
| May 17, 1984 | [JP] | Japan | 59-99003 |
| May 31, 1984 | [JP] | Japan | 59-111163 |
| Jun. 12, 1984 | [JP] | Japan | 59-121164 |

[51] Int. Cl.$^4$ .................................................. G11B 5/55
[52] U.S. Cl. .................................................. 360/106
[58] Field of Search ............... 360/106, 105, 104, 109, 360/97-99

[56] References Cited

U.S. PATENT DOCUMENTS

| 4,366,722 | 1/1983 | Hasler | 360/106 |
| 4,642,717 | 2/1978 | Matsuda et al. | 360/105 |
| 4,748,613 | 5/1988 | Isomura et al. | 360/106 |

*Primary Examiner*—Stuart N. Hecker
*Assistant Examiner*—David J. Severin
*Attorney, Agent, or Firm*—Cushman, Darby & Cushman

[57] ABSTRACT

In a driving apparatus for a magnetic head, a steel band is connected to a head carriage along first and second faces of the head carriage and operatively wound around a capstan at a side of the second face to give linear motions to the head carriage in response to rotation of the capstan. A part of the steel band is pressed by a spring into a recess formed on the first face when is perpendicular to directions of the linear motions of the head carriage.

5 Claims, 20 Drawing Sheets

DRIVING APPARATUS FOR A MAGNETIC HEAD

This is a division of application Ser. No. 733,910, filed May 14, 1985.

BACKGROUND OF THE INVENTION

1. Field of the Invention

The present invention relates generally to a magnetic disk apparatus for recording and reading of digital data in a magnetic disk cartridge.

2. Description of the Prior Art

Magnetic disk apparatus for recording and reading digital data of computers or the like must have accurate mounting of the cartridge on a motor driving means for accurate operation of the recording and reading. And therefore hitherto a mechanism for such accurate insertion has been very complicated as disclosed in FIG. 1 through FIG. 3 of the Japanese unexamined published application Sho59-154669, wherein the mechanism has too great a number of trigger levers, thereby resulting in necessitating a strong pressing force when inserting the cartridge. And the assemblage of the prior art has necessitated many assembling steps which may lead to a decrease of liability.

SUMMARY OF THE INVENTION

The main purpose of the present invention is to provide a magnetic disk apparatus capable of inserting a magnetic disk cartridge with a small pressing force for insertion by decreasing the number of the trigger levers and to have higher reliability of the apparatus with a lower assembling cost and a smaller number of components.

Another object of the present invention is to provide a magnetic disk apparatus wherein erroneous wrong side insertion of the cartridge can be prevented.

Another object of the present invention is to provide a driving means for conveying driving force of a motor to a magnetic disk with high reliability of engagement between the magnetic disk and the driving means, irrespective of mutual angular positions of a driving pin and an engaging hole of a metal core of a magnetic disk in a cartridge.

Still another object of the present invention is to provide a means for preventing erroneous insertion of the magnetic disk cartridge, even for a cartridge having an automatic shutter.

In the magnetic disk apparatus in accordance with the present invention, the insertion of an erroneous side of a magnetic disk cartridge can be checked at only a shallow stage of insertion of the magnetic disk cartridge by providing a prevention pin in a vicinity of a cartridge slot.

Furthermore, by devising a special type of pin which serves as a positioning pin on the upper or front side of the base plate and also serves as a fixing pin to fix a printed circuit substrate onto the face plate.

In the magnetic disk apparatus of the present invention, by adopting a special mounting configuration of the driving pin of the motor, the reliability of insertion of the pin into the engaging hole of the magnetic sheet cartridge can be improved.

In the magnetic disk apparatus in accordance with the present invention, by providing a specially designed tension means to give an adjusted tension on a steel band for driving a head carriage, a stable operation of the carriage drive for a long time is assured.

Furthermore, by adopting a specially designed steel band fixing piece, reliability of the steel band fixing on a capstan is improved.

The magnetic disk apparatus in accordance with the present invention comprises:

a base plate having a disk driving means thereon driven by a motor thereunder, a slider which is horizontally slidably held on the base plate, a cartridge holder for holding a cartridge of a magnetic disk therein, having vertically slidable holding means, means for vertically shifting positions of the cartridge holder basing on a horizontal sliding of the slider, and slider driving means having a trigger lever to be shifted of its position at insertion of the cartridge and energization means for driving the slider at the shifting of position of the trigger lever.

DESCRIPTION OF THE PREFERRED EMBODIMENT

Figure 1:
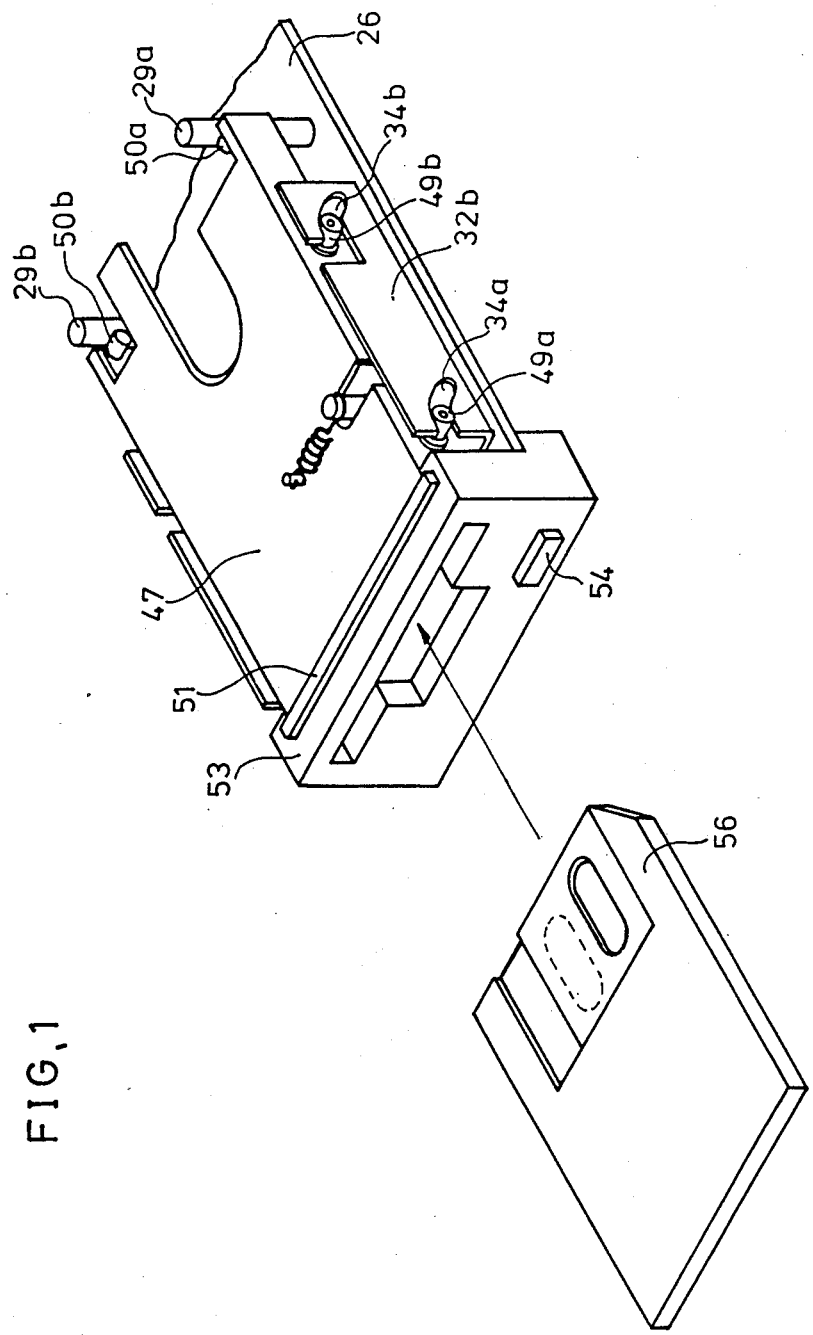
FIG. 1 is a perspecrive view showing essential parts of the magnetic disk apparatus embodying the present invention.
Figure 2:
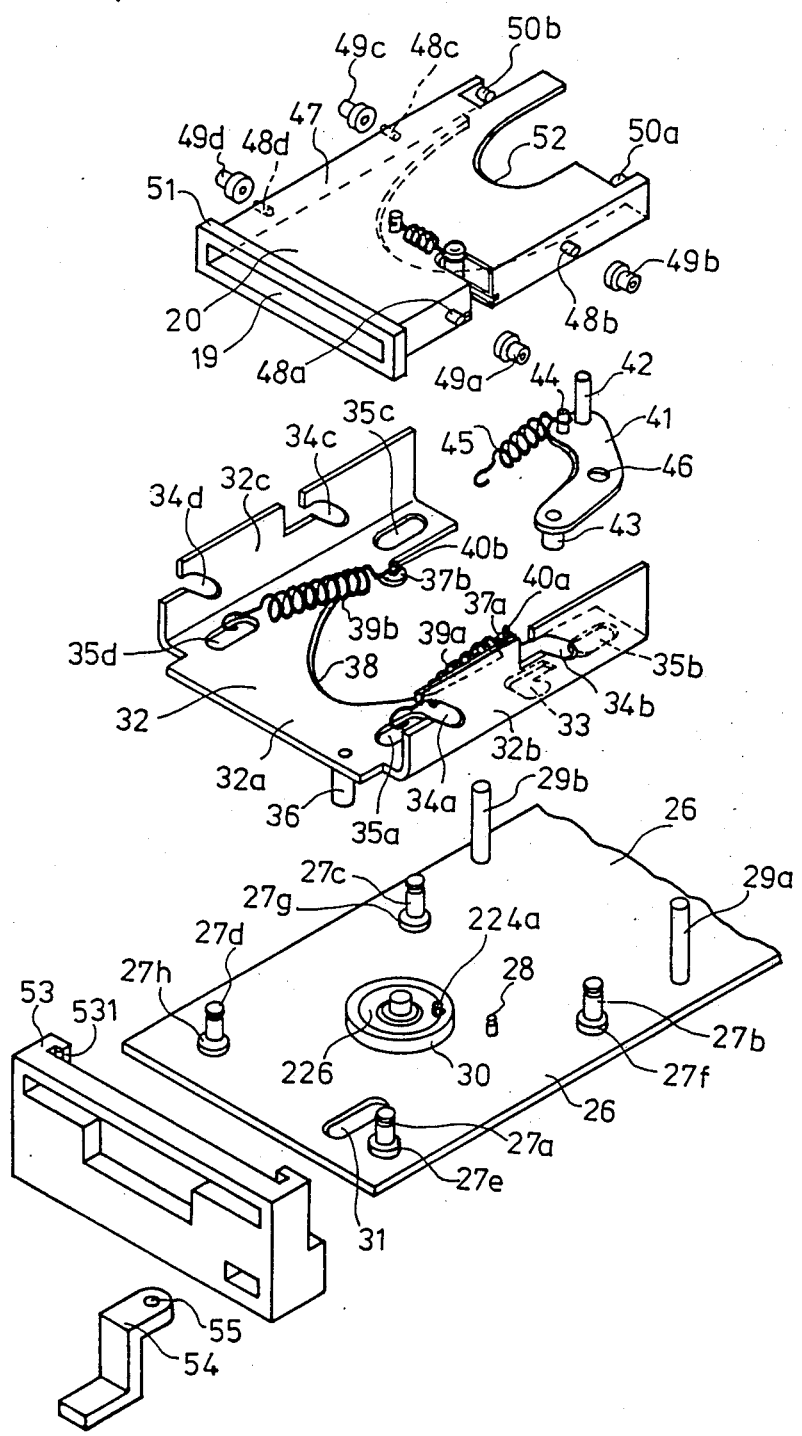
FIG. 2 is an exploded perspective view of the apparatus of FIG. 1.

In FIG. 1 and FIG. 2 which are perspective views showing essential parts of the preferred embodiment of the present invention, four protrusions or pins 27a, 27b, 27c and 27d having larger diameter parts 27e, 27f, 27g, 27h for giving low friction for a slider 32 to be put thereon, and a pin 28 which is smaller than the aforementioned pins are formed on a base plate 26. The base plate 26 also has a pair of pins 29a and 29b which are taller than the aforementioned pins. The base plate 26 further has a rotation driver 30 for driving a magnetic disk as a recording media in a magnetic disk cartridge. An oblong slot 31 for defining a sliding range of the slider 32 by engaging therein a pin 36 of the slider 32 is provided on the base plate 26. The slider 32 is formed to have a flat bottom part 32a and a pair of side walls 32b and 32c. The bottom plate 32a has an L-shaped slot 33 and further has four slots 35a, 35b, 35c and 35d to which the aforementioned pins 27a, 27b, 27c and 27d are to be inserted, respectively, for slidable holding of the slider 32 on the base plate 26. The base plate 32a having the pin 36 thereunder further has a pair of pins 40a and 40b for fixing springs 39a and 39b, respectively. The side walls 32b and 32c have oblique guide slots 34a, 34b and 34c, 34d. The slider 32 is held slidably on the base plate 26 by inserting the pins 27a, 27b, 27c and 27d in the slots 35a, 35b, 35c and 35d, respectively. Since the pins 27a, 27b, 27c and 27d have the thicker diameter parts 27e, 27f, 27g and 27h, the slider 32 slides on these thicker diameter parts of small areas and therefore friction of sliding is small. The left ends of the springs 39a and 39b are fixed to the pins 27a and 27d, respectively, thereby energizing the slider 32 leftwards. The bottom plate 32a of the slider 32 has a large opening 38 for enabling mechanical contact of a driving roller of a driving motor 104 through an engaging hole of a magnetic disk cartridge. Horizontal movement range of the slider 32 is defined by length of the slots 35a, 35b, 35c and 35d and also 31. A trigger lever 41 is cradled at a fulcrum at its hole 46 by the pin 27b, passing the slot 35b. The trigger lever has a roller 43 which engages with the L-shaped slot 33, and the trigger lever is energized by a spring 45 held between a pin 44 and a pin 28 on the base plate. The trigger lever 41 is turned clockwise when its pin 42 is pushed leftwards by the front edge of a magnetic disk cartridge 56. When the cartridge 56 is removed leftwards, the trigger lever 41 is turned counterclockwise by the spring 45 and the roller 43 engages vent part of the L-shaped groove. A flat sleeve shaped cartridge holder 47 is provided with a vertically sliding means 51 which engages with vertical slot 531 of a front panel fixed to the face plate 26. Four guide rollers 49a, 49b, 49c and 49d pivotted on four pins 48a, 48b, 48c and 48d are slidably engaged in the oblique slots 34a, 34b, 34c and 34d, respectively, so that horizontal, namely, front-rear motion of the slider 32 induces vertical motion of the cartridge holder 47. The cartridge holder 47 further has stop rollers 50a and 50b which stop the front edge of the cartridge and also guide vertical motion of the cartridge holder 47 by sliding along the pins 29a and 29b. The top plate 20 and bottom plate 19 of the cartridge holder 47 has U-shaped openings to enable contact of a magnetic head to the upper face of the magnetic disk and engagement of the rotation driving roller to the driving hole of the cartridge. The front panel 53 has an operation button 54 which has a round hole 55, through which the aforementioned pin 36 of the slider 32 passes.

Figure 3A:
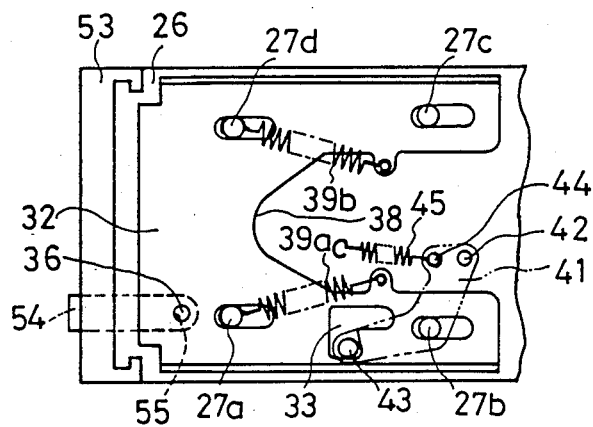
FIG. 3(A) and FIG. 3(B) are plan view and side view of the apparatus of FIG. 1 and FIG. 2 shown with its cartridge holder removed.

Next, operation of the above-mentioned configuration is described. FIG. 3(A) shows a state where the cartridge 56 is not yet inserted in the cartridge holder 47, a state where the cartridge 56 is in a midway state of insertion to the cartridge holder 47 and a state where the cartridge is fully inserted in the cartridge holder 47, respectively.

Figure 3B:
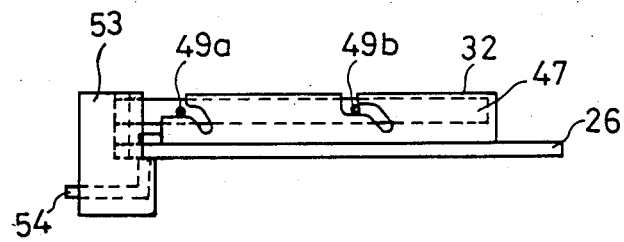
Figure 4A:
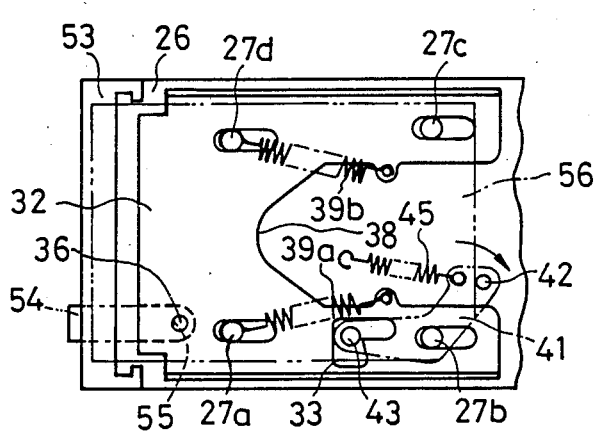
FIG. 4(A) and FIG. 4(B) are plan view and side view, respectively, of the apparatus of FIG. 1 and FIG. 2 showing a state when a magnetic sheet cartridge 56 is half inserted.
Figure 4B:
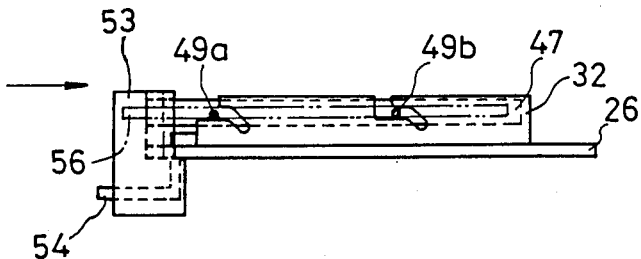
Figure 5A:
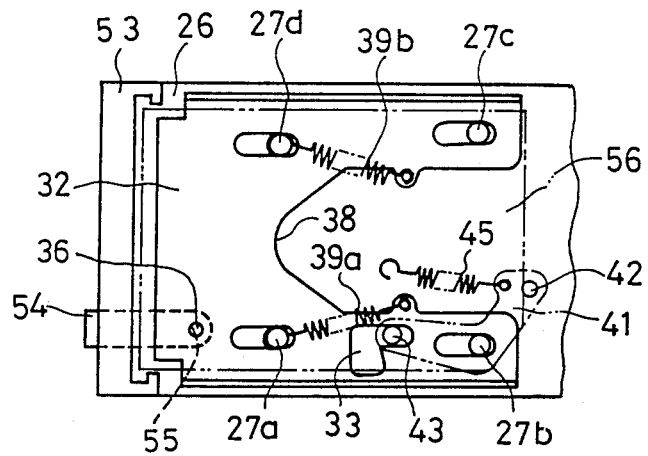
FIG. 5(A) and FIG. 5(B) are plan view and side view, respectively, of the apparatus of FIG. 1 and FIG. 2 showing a state when the magnetic disk cartridge 56 is fully inserted.
Figure 5B:
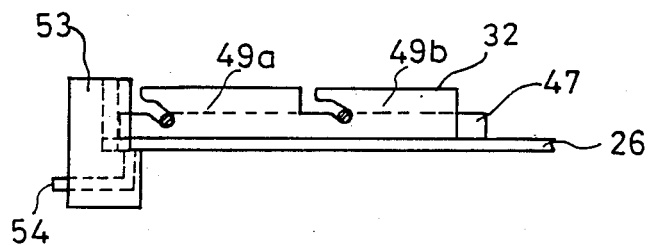

Before the cartridge 56 is inserted in the cartridge holder 47, the cartridge holder 47 is lifted from the slider 32, and all the guide rollers 49a, 49b, 49c and 49d are at the left most positions of the oblique slots 34a, 34b, 34c and 34d, and the slider 32 is apart from the front panel 53 as shown in FIG. 3(B). That is, in this state the trigger lever 41 is in the turning position of the L-shaped slot 33 by being energized by the spring 45, thereby about to allow the horizontal sliding motion of the slider 32. Then, when the cartridge 56 is half inserted in the cartridge holder 47 as shown in FIG. 4(A) and FIG. 4(B), the pin 42 is pushed by the front edge of the cartridge 56, and thereby the trigger lever 41 is rotated clockwise. And when the pin 43 is released from the locked position of the L-shaped slot 33, the slider 32 is driven towards the front panel 53 by the contraction springs 39a and 39b, and thus the slider 32 makes contact to the front panel 53 as shown in FIG. 5(A) and FIG. 5(B). In this state, since the slider 32 comes to the left most position, the rollers 49a, 49b, 49c and 49d go down in the oblique slot 34a, 34b, 34c and 34d, and therefore the cartridge holder 47 goes down on the slider 32. Thereafter magnetic heads make contacts on the magnetic disk of the cartridge 56.

Taking out of the cartridge 56 is done by pushing the button 54. That is, when the button 54 is pushed from the state of FIG. 5(A) and FIG. 5(B), the slider 32 is pushed rightward to the state shown in FIG. 4(A) and FIG. 4(B), wherein the trigger lever 41 is rotated counterclockwise by the force of the spring 45, and the roller 43 of the trigger lever 41 again comes to the lock position of the L-shaped slot 33. By the rightward moving of the slider 32 the cartridge holder 47 is lifted up. Then, the cartridge 56 is pushed leftward by the pin 42 of the trigger lever by the force of the spring 45, thereby making the left end of the cartridge 56 peep out of the panel 53. As has been described, by combination of the rotation of the trigger lever 41, horizontal motion of the slider 32 and the vertical displacement of the cartridge holder 47, mounting and demounting of the cartridge 56 can be easily made.

The configuration of this embodiment comprises only six principal components, namely the base plate 26, the front panel 53 having a vertical sliding rail, the cartridge demounting button 54, the slider 32, the trigger lever 41 and the cartridge holder 47. And therefore, the configuration is simple and assembling is easy, thereby providing a reliable cartridge mounting configuration at a reasonable cost. In the ejection of the cartridge 56, the guide rollers 49a, 49b, 49c and 49d climb up to a short horizontal part of the oblique slots 34a, 34b, 34c and 34d, and therefore the cartridge 56 is not ejected too strongly. Since the number of trigger levers is only one, the operation of the mechanism is stable.

Figure 6:
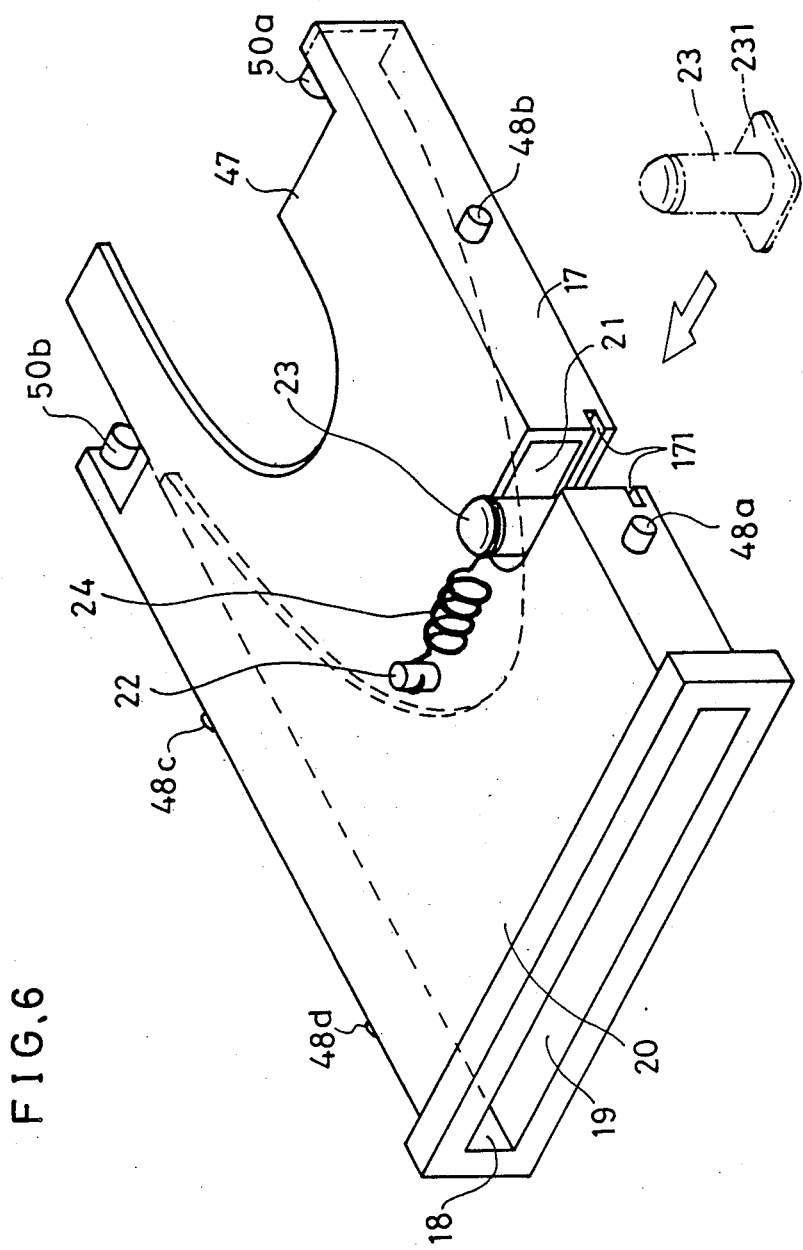
FIG. 6 is a perspective view showing a configuration for preventing insertion of the magnetic sheet cartridge in the wrong side.

Next, the apparatus devised for preventing the inserting of the magnetic disk cartridge in the wrong side is described with reference to FIG. 6 through FIG. 10(A) and FIG. 10(B). As shown in FIG. 6, the cartridge holder 47 has a slot 21 on one side and a slide pin 23 is slidably held by engaging its base plate 231 in guide slots 171 formed in the bottom plate of the cartridge holder 47. A a tension spring 24 is provided between a pin 22 fixed on the top plate of the cartridge holder 47 and the top of the slide pin 23 to energize the slide pin 23 towards the center part of the cartridge holder 47.

Figure 7A:
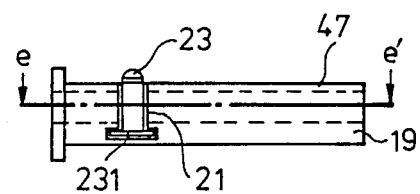
FIG. 7(A) is a side view showing a configuration to prevent insertion of the magnetic disk cartridge in a wrong side.
Figure 7B:
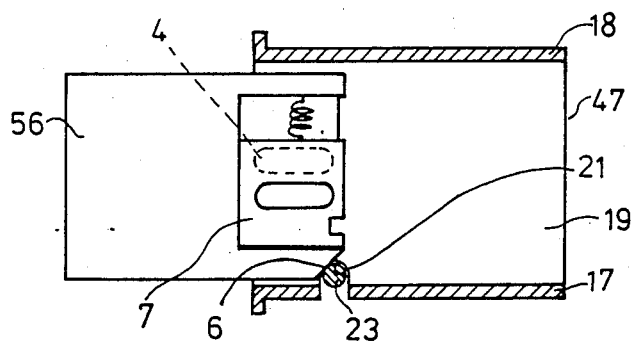
FIG. 7(B) is a plan view of the configuration of FIG. 7(A) at a state where the magnetic disk cartridge in a right side is going to be inserted.
Figure 7C:
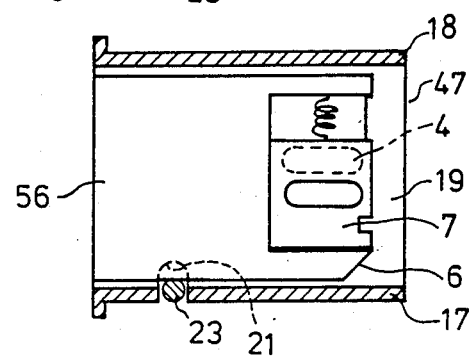
FIG. 7(C) is a plan view of the configuration of FIG. 7(A) wherein the magnetic disk cartridge 56 is inserted to a right position.

The operation of the above-mentioned configuration is described with reference to FIG. 7(A) which is a side view of the cartridge holder 47, FIG. 7(B), FIG. 7(C) and FIG. 7(D) which are sectional plan views at sectional plane e—e' for various modes of insertion of the cartridge therein. As shown in FIG. 7(B), the cartridge 56 has oblique edge 6 at one corner. FIG. 7(B) is the case where the cartridge 56 is during the step of insertion in right direction. Since there is the oblique cut edge 6, when the cartridge is inserted in the right side, the oblique edge 6 pushes the slide pin 23 outside and the cartridge 56 can be inserted as shown in FIG. 7(C). When the cartridge 56 is removed from the cartridge holder 47, the slide pin 23 restores to the original inside position by means of the tension force of the spring 24.

Figure 7D:
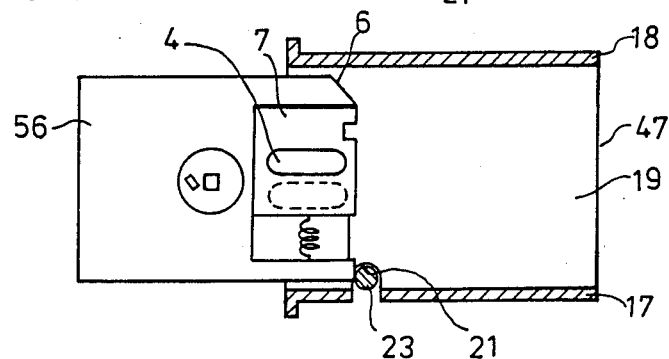
FIG. 7(D) is a plan view of the configuration of FIG. 7(A) when the magnetic disk cartridge is inserted in a wrong side.

When the cartridge 56 is inserted in the wrong side as shown in FIG. 7(D), the square corner of the cartridge 56 collides the pin 23, and therefore the cartridge 56 can not advance any more. This erroneous insertion prevention device can operate even for those cartridges provided with automatic protection barrier as described in FIG. 8(A) through FIG. 10(B).

Figure 8A:
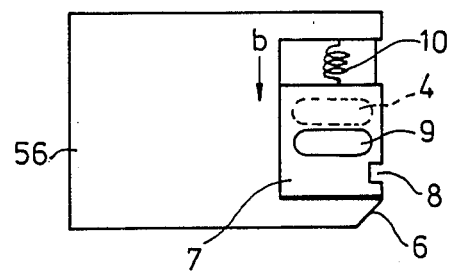
FIG. 8(A) and FIG. 8(B) are plan views of the magnetic disk cartridge showing a state when its protection barrier is closed and when the protection barrier is opened, respectively.
Figure 8B:
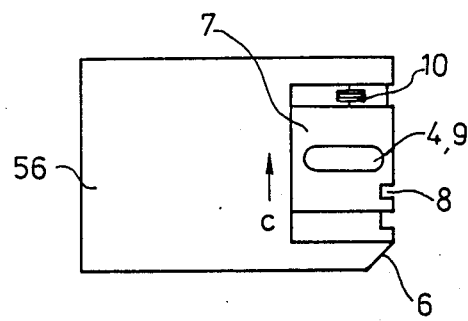

Next, configuration of the device to open the automatic protection barrier of the magnetic disk cartridge 56 is described with reference to FIG. 8(A) through FIG. 10(B). FIG. 8(A) shows the cartridge with its automatic protection barrier 7 closed on an opening 4. FIG. 8(B) shows the cartridge with its automatic protection barrier 7 opened ready for data recording or data reading. The automatic protection barrier 7 is slidably provided on recording-and-reading-opening 4 and has a spring 10 which energized the protection barrier 7 to automatically close. The front edge of the automatic protection barrier 7 has an indent 8. When a force is added to the indent 8 of the automatic protection barrier 7, the latter is opened as shown in FIG. 8(B) thereby exposing the magnetic disk from the openings 4 and 9 of the cartridge and the cover.

Figure 9A:
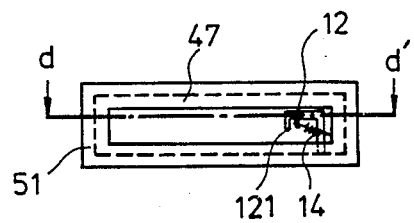
FIG. 9(A) is a front view showing a configuration of a protection barrier opener of the cartridge holder.
Figure 9B:
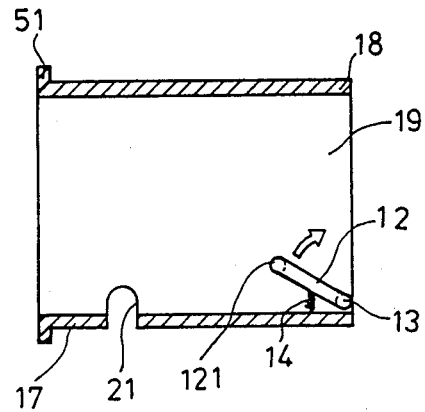
FIG. 9(B) is a plane view of the same configuration in FIG. 9(A).
Figure 10A:
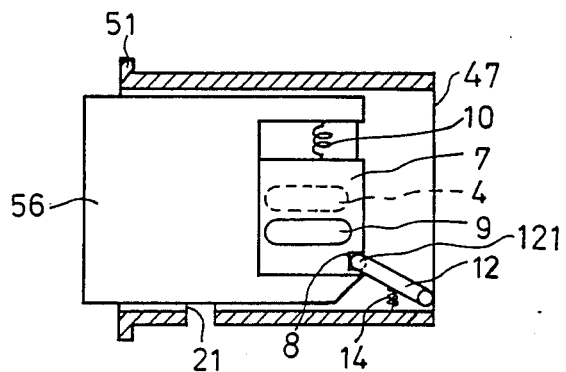
FIG. 10(A) and FIG. 10(B) are plan views showing half insertion state and full insertion state of the magnetic disk cartridge in the cartridge holder, respectively.
Figure 10B:
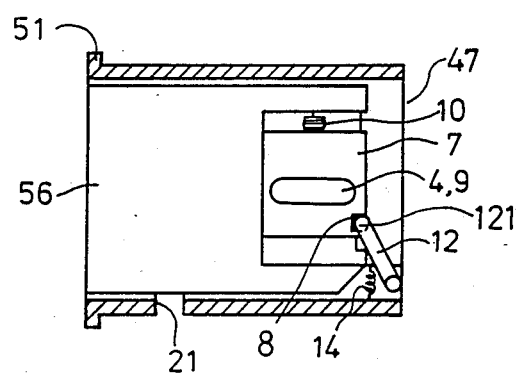

The cartridge holder 47 has a protection cover opening device 12, which is a lever having an acting arm 121 and pivotted on the bottom plate of the cartridge holder 17 and energized by a tension spring 14. The engaging arm 12 is resting in a position shown in FIG. 10(A) in normal state, and when a pushing force is applied thereto, it can turn clockwise. FIG. 10(A) and FIG. 10(B) show process of insertion of the cartridge 56 into the cartridge holder 47 and resultant opening of the automatic protection barrier 7 by the barrier opening lever 12. When the front edge of the cartridge 56 reaches the acting arm 121, the arm engages with the indent 8 of the protection barrier 7. Then, as the cartridge 56 is further inserted to the state of FIG. 10(B), the indent 8 of the protection barrier 7 is pushed by the acting arm 121 and the arm rotates clockwise. Accordingly, the automatic protection barrier 7 is pushed to its opening position as shown in FIG. 9(B). When the cartridge 56 is removed from the cartridge holder 57, the engagement of the acting arm 121 with the indent 8 of the protection barrier is dissolved, and therefore the protection barrier 7 is restored to its original closed position by means of the spring 10 as shown in FIG. 10(A).

Next, positioning device for cartridge mounting is described with reference to FIG. 11 through FIG. 15.

Figure 11:
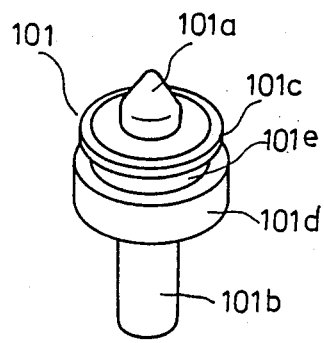
FIG. 11 is a perspective view showing a positioning pin for guiding the magnetic disk cartridge into a right position with respect to the base plate.
Figure 12:
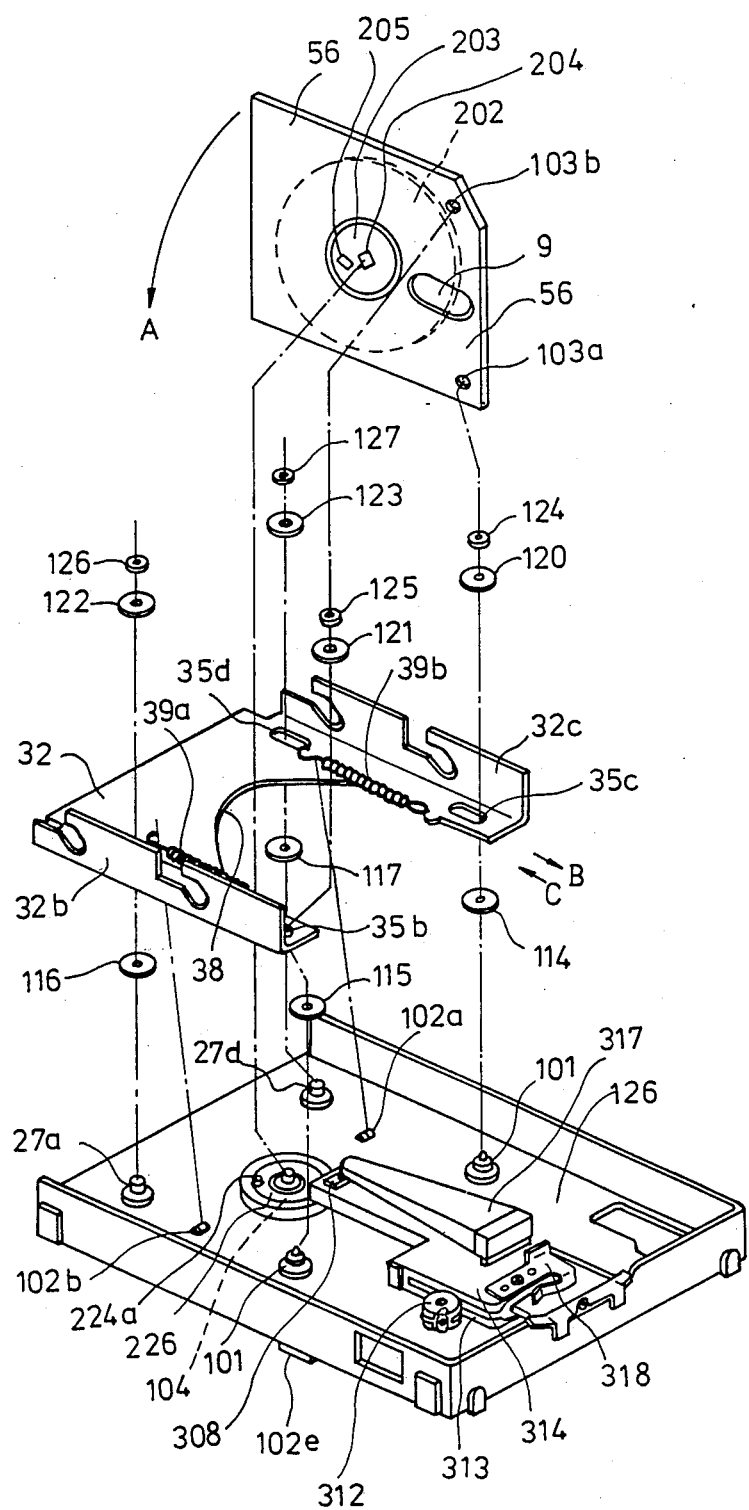
FIG. 12 is an exploded perspective view showing a a modified embodiment of the present invention.
Figure 13:
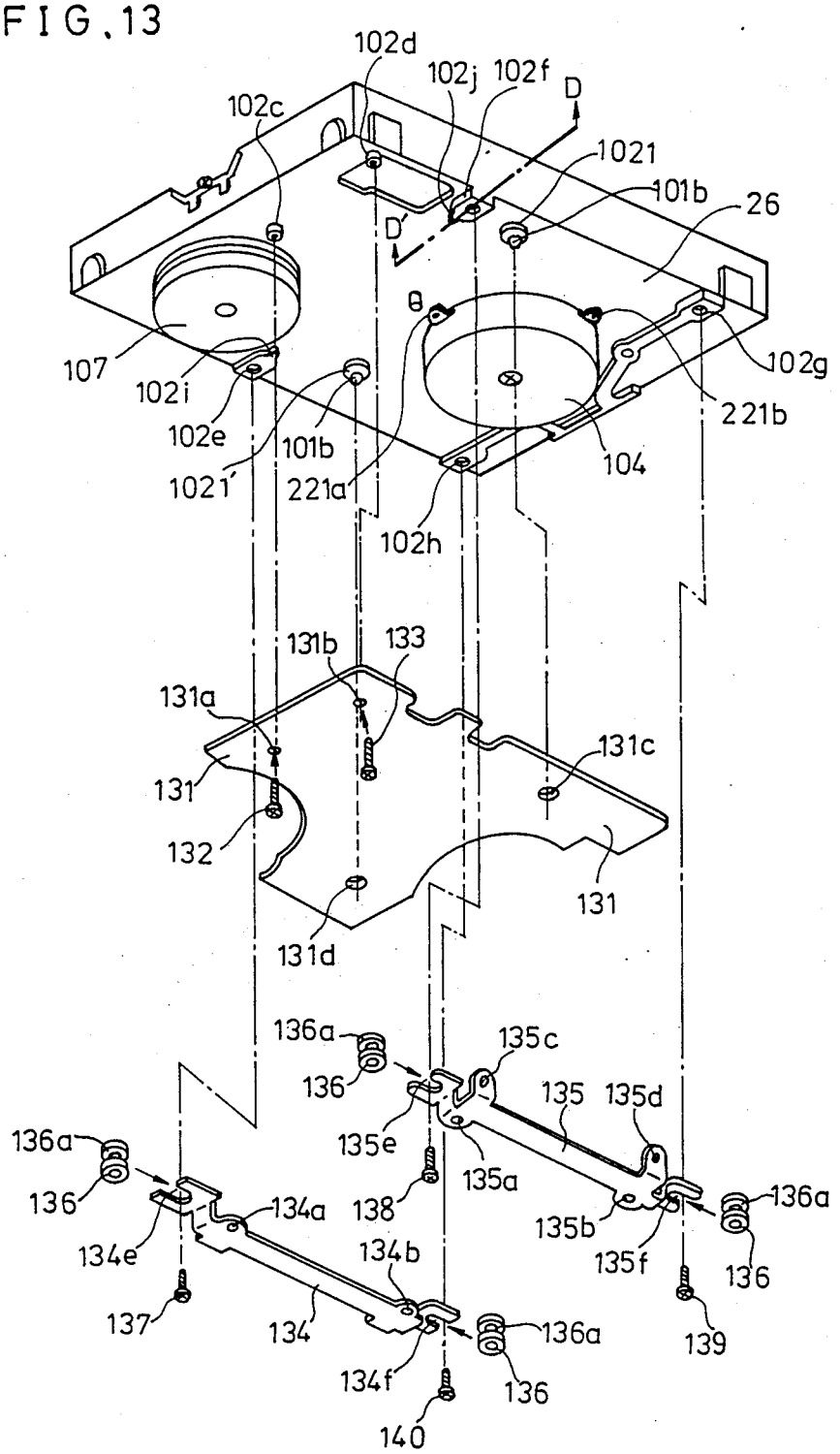
FIG. 13 is also an exploded perspective view of an underneath part of the base plate 26 of the embodiment of FIG. 12.
Figure 14:
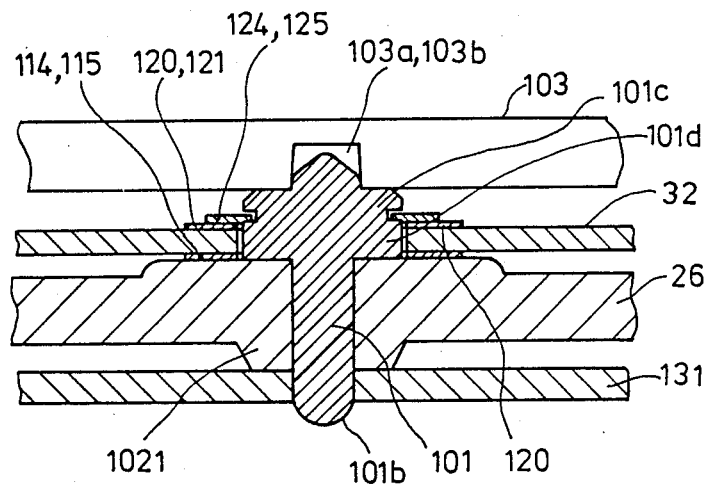
FIG. 14 is a sectional view showing the configuration and function of the positioning pin of FIG. 11.
Figure 15:
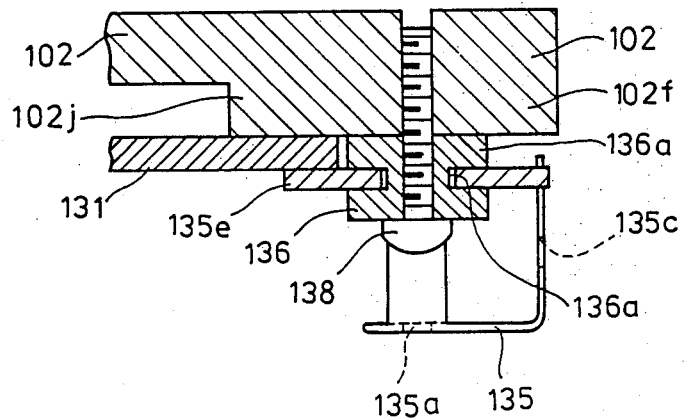
FIG. 15 is a sectional view of a part of the configuration of FIG. 13.

FIG. 11 is a perspective view of a positioning pin 101 which serves to guide positioning of the magnetic disk cartridge 56 by its top part 101a and also serves as tying pin for tying the base plate 26 and an underlying printed circuit substrate 31. FIG. 12 is an exploded perspective view of the base plate 26', the overriding slider 32 and a head carriage 314. FIG. 13 is an exploded perspective view of bottom side of the base plate 26'. FIG. 14 is a sectional view showing the state of use of the positioning pin 101 on the base plate 26. FIG. 15 is a sectional side view showing a magnetic disk apparatus holder 135 fixed on the lower face of the base plate 26. As shown in these drawings, the positioning pin 101 has a conical top 101a on its top part, a fitting cylindrical part 101b in the lower end and further an upper core part 101c and a lower core part 101d in the medium part, the core part having a larger diameter than the aforementioned conical top 101a and the cylindrical lower part 101b. As shown in FIG. 14, a washer 124 is inserted in a slot between the upper core part 101c and the lower core part 101d, and the slider 32 is slidably held under the washer 124 with an additional washer 120 between the slider 32 and washer 124, and the lower cylindrical part 101b is fixed by fitting in a hole of the base plate 26, and further the printed circuit substrate 131 is fixed on the lower end tip of the lower cylindrical part 101b by fitting.

The base plate 26 comprises a direct-drive motor 104 for rotating the magnetic disk in the cartridge 56 and also has a step motor 107 for driving the head carriage 314 through a capstan 105 and a steel band 313. The cartridge 56 is inserted between the head carriage 314 and a head arm 317. Rotation of the direct drive motor 104 is conveyed through a roller 224a to an opening 205 of a center metal core of the cartridge 56 to drive a magnetic disk 202. The cartridge 56 has a pair of positioning holes 103a and 103b to which the conical top 101a of the positioning pin 101 is inserted when the cartridge 56 is placed in a right position. On the underneath surface of the base plate 26, protrusions 1021 and 1021' both having through-holes for fitting the lower cylindrical part 101b of the positioning pin 101 are formed. The protrusions 1021 and 1021' serves to hold the printed circuit substrate 131 with a predetermined isolation gap from the lower surface of the base plate 26. On the lower face of the base plate 26, a pair of mounting frame 134 and 135 are fixed by inserting indents 134e, 134f and 135e, 135f in a narrowed neck parts 136a of spacers 136, which is fixed by screws 137, 138, 139 and 140 on the lower face of the base plate 26. The mounting frames 134 and 135 are for mounting the magnetic disk apparatus into a computer body or the like apparatus. The printed circuit substrate 131 is further fixed by screws 132 and 133 on the lower surface of the base plate 26.

Figure 16:
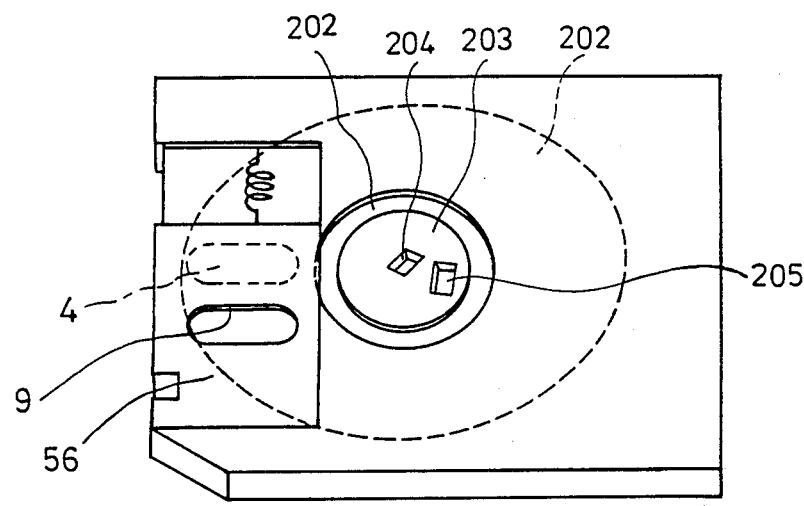
FIG. 16 is a perspective view showing a configuration of the lower face of the magnetic disk cartridge 56.
Figure 17:
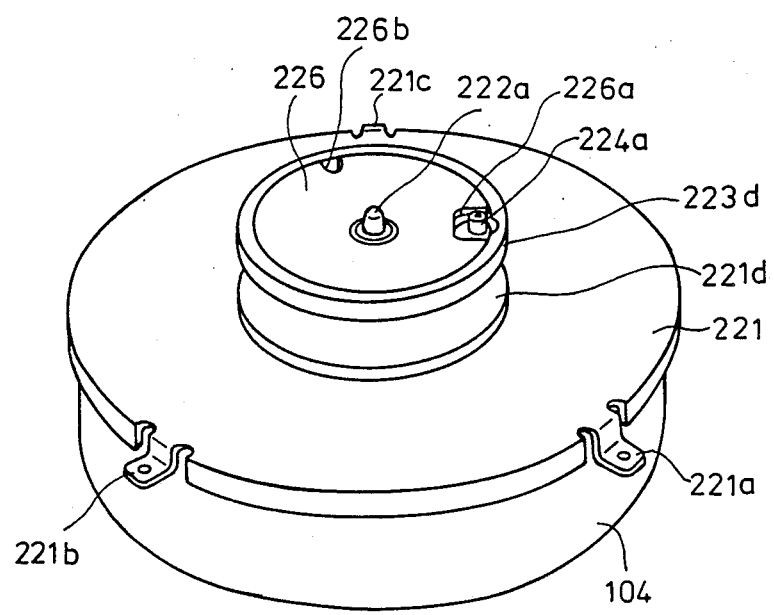
FIG. 17 is a perspective view of a motor for driving a magnetic disk in the cartridge.
Figure 18:
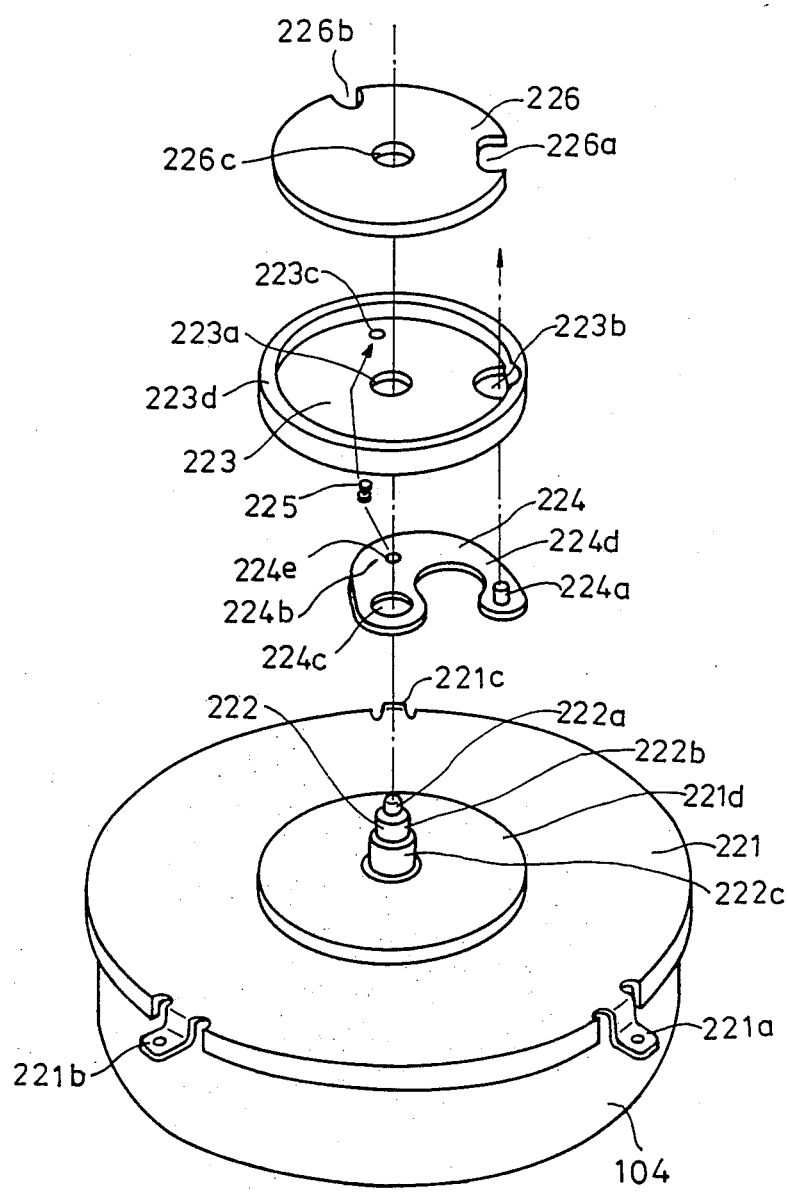
FIG. 18 is an exploded view of the motor of FIG. 17.
Figure 19:
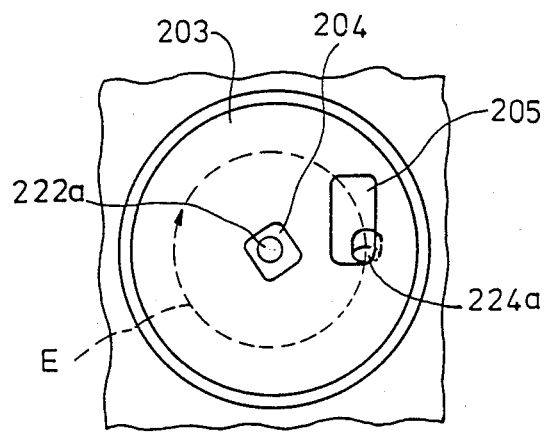
FIG. 19 is an enlarged plan view of a metal core part of the magnetic disk and the underlying driving pin of the motor.
Figure 20:
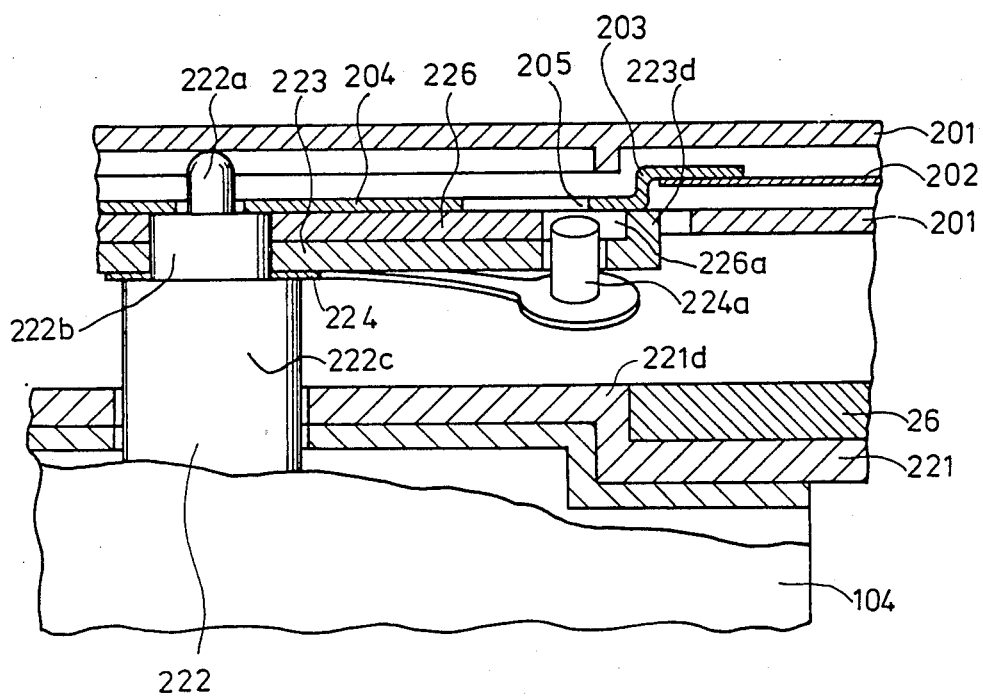
FIG. 20 is a sectional side view showing essential parts of the metal core part of the magnetic disk and the rotation driving pin to be engaged in a hole of the metal core of the magnetic disk.
Figure 21A:
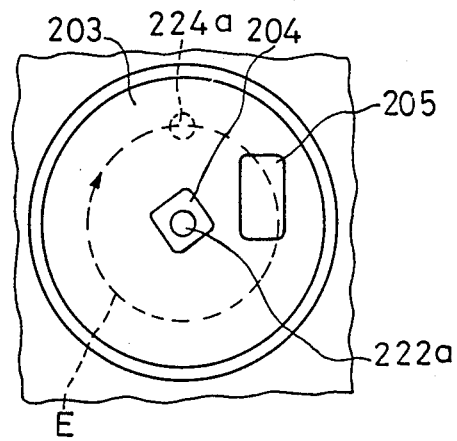
FIG. 21(A), FIG. 21(B) and FIG. 21(C) are plan views showing relations between the magnetic disk cartridge and the rotation driving pin.
Figure 21B:
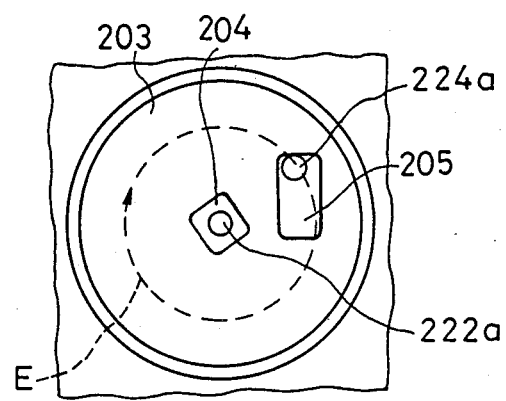
Figure 21C:
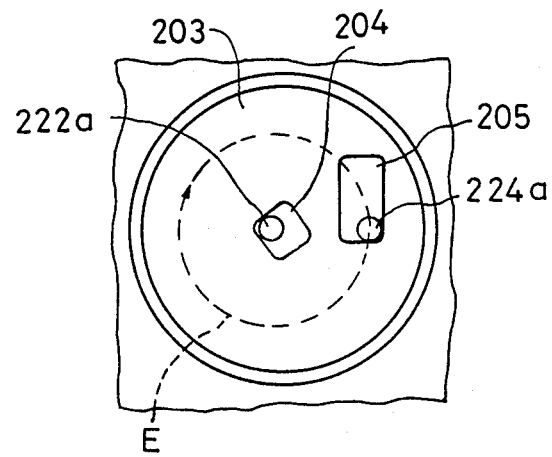

Next, the rotation driving mechanism for the cartridge is described with reference to FIG. 16 through FIG. 21. FIG. 16 is a perspective view of the lower face of the magnetic disk cartridge 56. FIG. 17 is an enlarged perspective view showing the top parts of the direct-drive motor 104 for driving the cartridge. FIG. 18 is an exploded perspective view of an essential part of the rotation driving roller 224a and related components. FIG. 19 is a bottom view of the central part of the cartridge together with the driving roller 224a. FIG. 20 is an enlarged sectional elevation view of the essential part around the driving roller 224a and the cartridge. FIG. 21(A), FIG. 21(B) and FIG. 21(C) are bottom views of the cartridge of various states in relation to a shaft 207 and the driving roller 224a of the direct-driving motor 104s.

As shown in FIG. 16, the cartridge 56 has a magnetic disk 202, a metal core 203 exposed from the central circular opening 562. The metal core 203 has at its center a square hole 204 for engaging with motor axis 222a and a larger oblong hole 205 for engaging with the driving roller 224a. Furthermore, the cartridge 56 has oval openings 4 on both sides covered by the protection barrier 7. The oval openings 4 are for contacting magnetic head for data recording and data reading therethrough.

The direct-drive motor 104 is mounted in a circular hole of a base plate 26 by three fixing tabs 221a, 221b and 221c formed on the periphery of the top cover 221 of the motor 104. A shaft 222 of the motor 104 has a thickest part 222c at a lower portion, medium part 222b in a medium portion and thinner part 222a at the top portion, all in integral constitution. A circular yoke 223 having a hole 223b at one peripheral part for passing the driving roller 224a is fixed on the intermediate part 222b of the axis. A leaf spring 224 having the driving roller 224a on its moving end is fixed between the thicker part 222c and the lower face of the yoke 223, and a fulcrum hole 224e in an intermediate bending part 224b of the leaf spring 224 is fixed by a small loose rivet 225 on the lower face of the yoke 224. The yoke 223 has peripheral protrusions 223d for contacting the metal core 203 of the cartridge. A permanent magnet 226 for absorbing the metal core 203 of the cartridge is provided on the upper face of the yoke 223 with such thickness that the upper face of the permanent magnet 226 is flash with the upper edge of the peripheral protrusion 223d. The permanent magnet 226 has an indent 226a for passing the driving roller 224a and a small indent 226b for positioning the upper end of the loose rivet 225. Since the leaf spring 224 is very flexible, the driving roller 224a is tilted when the top part thereof is pushed by the lower face of the metal core 203.

The operation of the above-mentioned configuration is as follows. As shown in FIG. 16 through FIG 21(C) when the cartridge 56 is mounted on the direct-drive motor 104, even in such a relation between the cartridge 56 and the shaft 222a of the direct-drive motor 104 as shown in FIG. 19. That is when the upper edge of the driving roller 224a contacts a part of the metal core 203 as a result of bending due to flexibility of the leaf spring 224, the driving roller 224a can rotate under the metal core 203, and the driving roller can rotate fairly smoothly in a direction shown by the arrow. Thus after nearly one rotation of the driving roller 224a, the driving roller drops in the oblong hole 205, and thereafter the driving roller 224a drive the magnetic disk 202 connected to the metal core 203. In case the lower face of the yoke 223 is formed by a low friction plastic, the rotation of the driving roller 224a in the tilted state until dropping in the oblong hole 205 becomes more smooth.

The configuration to prevent loosening of steel band of the head carriage 314 is described with reference to FIG. 22 through FIG. 27.

Figure 22:
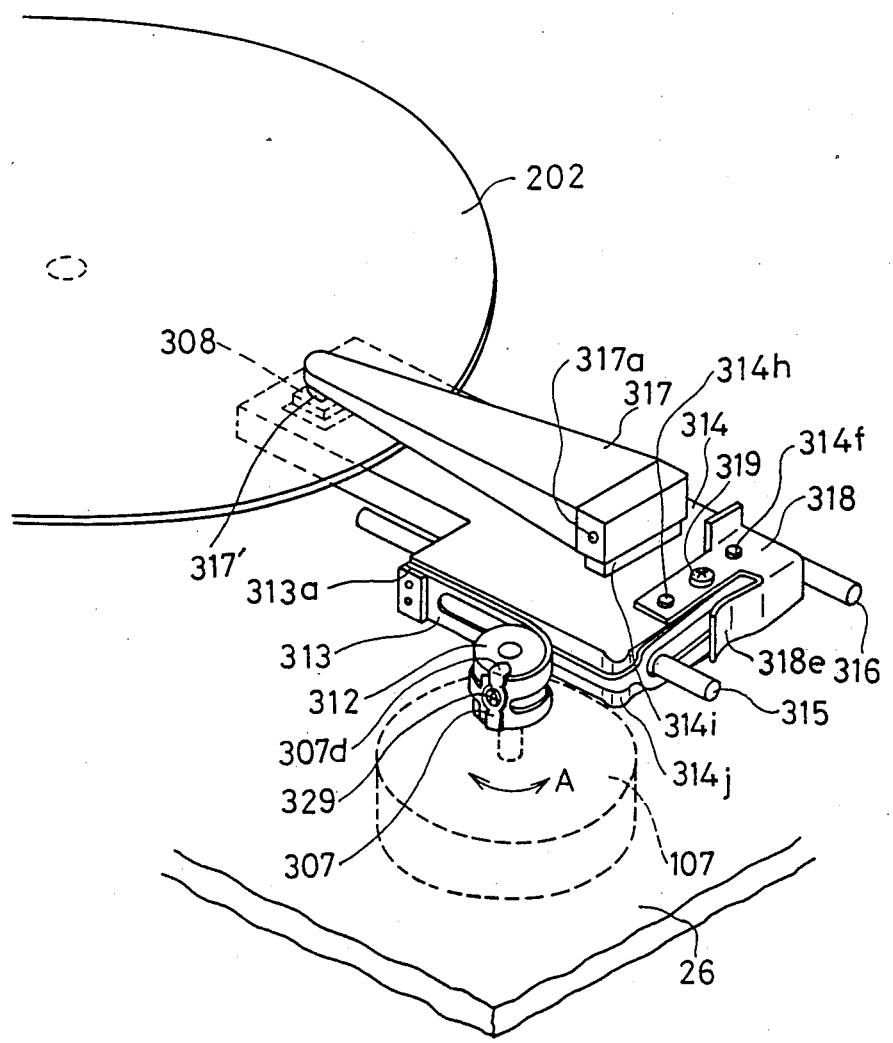
FIG. 22 is a perspective view showing a configuration of a head driving system having an improved steel band fixing.
Figure 23A:
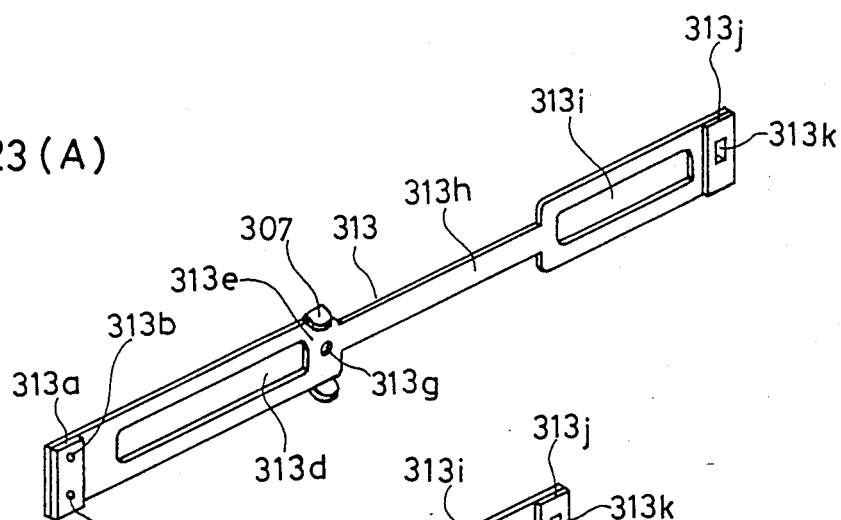
FIG. 23(A) and FIG. 23(B) are perspective views of a developed state and a wounded state of the steel band of FIG. 22, respectively.
Figure 23B:
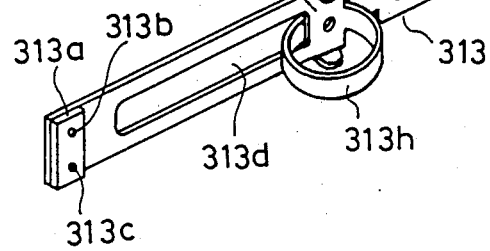
Figure 24A:
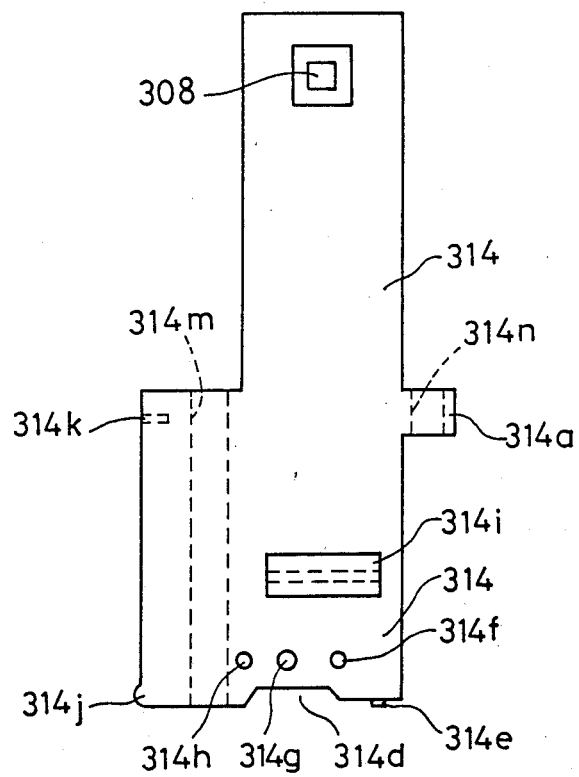
FIG. 24(A) and FIG. 24(B) are plan view and rear view of a head carriage of the configuration of FIG. 22, respectively.
Figure 24B:
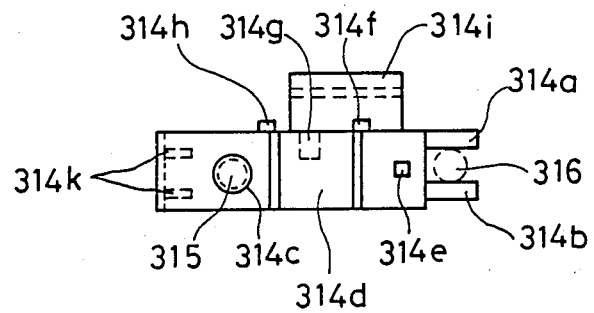

FIG. 22 is a perspective view showing the part for mounting the steel band for driving the head carriage 314. FIG. 23(A) is a perspective view showing developed state of the steel band and FIG. 23(B) is a perspective view of the steel band which has been wound. FIG. 24(A) and FIG. 24(B) are plan view and rear view of the head carriage 314 with the steel band 313 removed.

Figure 25A:
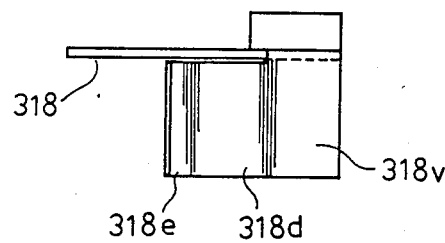
FIG. 25(A), FIG. 25(B) and FIG. 25(C) are rear view, plan view and side view of a tensioning spring of the configuration of FIG. 22, respectively.
Figure 25C:
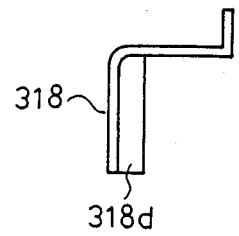
Figure 25B:
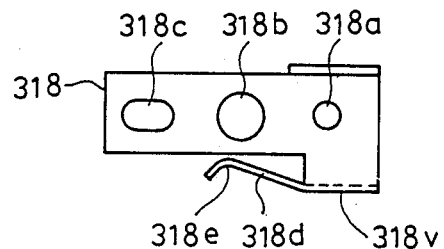
Figure 26:
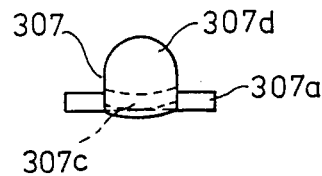
FIG. 26(A), FIG. 26(B), and FIG. 26(C), and 26(d) are front view, plane view, side view, and sectional plane view of a steel-band guide piece of the configuraion of FIG. 22.
Figure 26:
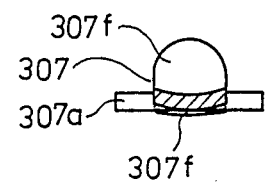
Figure 26:
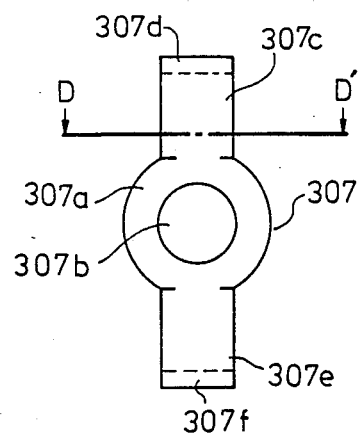
Figure 26:
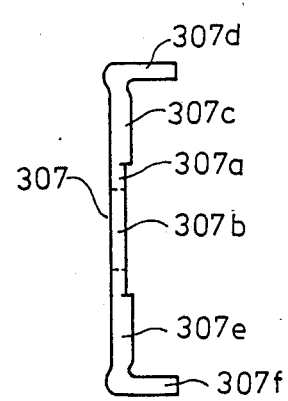
Figure 27:
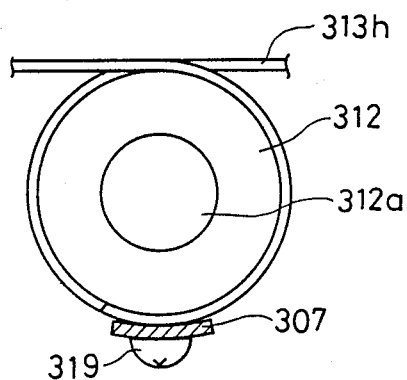
FIG. 27 is a plan view illustrating fixing configuration of the guide piece on the steel-band.

FIG. 25(A), FIG. 25(B) and FIG. 25(C) are rear view, plan view and side view of a specially designed spring 318 for keeping appropriate tension of the steel band 313. FIG. 26(A), FIG. 26(B), FIG. 26(C) and FIG. 26(D) are front view, plane view, side view and a sectional plane view at a sectional plane D—D' of FIG. 26(A).

As shown in FIG. 22, a capstan 312 of a step motor 107 which is fixed underneath the base plate 26 is provided above the face plate 26, and a steel band 313 which is wound around the capstan 312 is fixed with both ends to one corner on the head carriage 314 and to the diagonal corner thereto of the head carriage 314. The central part of the steel band 313 makes one turn around the capstan 312. The head carriage 314 is slidably held on a pair of guide shafts 315 and 316. A pair of magnetic heads are provided on an upper surface of the head carriage 314 and on the lower surface of the head arm 317 provided on the head carriage 314, so that the magnetic disk 202 is disposed between the head carriage 314 and the head arm 317 is touched by the pair of magnetic heads on both surfaces. The head carriage 314 has a specially designed strong leaf spring 318 fixed at the rear face of the head carriage 314, by a screw 319 and two engaging protrusions 314h and 314f to give a tension to the steel band 313.

As shown in FIG. 23(A) and FIG. 23(B), one end 313a of the steel band 313 has small holes 313b and 313c for screw-fixing on the front side corner of the head carriage 314. The steel band 313 has a fixing piece 307 which is welded to the steel band on the outside surface of the latter for regulating the position and direction of the steel band 313 rightly on the capstan 312 not to be bent even after fixing a screw 329 on the steel band 313 and the capstan 312. The steel band 313 has a larger width part 313d is oblong aperture therealong and a smaller width part 313h which is to be wound around the capstan 312 and further a large width part 313i with another oblong aperture for passing one of the guide shaft 315 therethrough. Another end of the steel band has an engaging hole 313k which is to be engaged with a small pin 314e on the rear face of the head carriage 314 shown in FIG. 24(A). After engaging the small hole 313k with the small pin 314e, the engaging end of the steel band 313 is pressed by a vertical part 318e of the leaf spring 318 to hold the engagement. The head carriage 314 has a recess 314b at the rear face thereof, the rear face being vertical to the direction of the linear motion of the head carriage 314 and is facing one part of the steel band 313. The recess 314d is for inducing the appropriate tension to the steel band 313 by pressing the latter to the recess part 314d by a pressing member 318d of the leaf spring 318. The engaging holes 318a and 318c are engaged on the protrusions 314h and 314f and a fixing screw 319 is screwed into a screw hole 314g to fix the leaf spring 318 on the head carriage 314. The head carriage 314 has thru holes 314m and 314n which are for slidably engaging the guide shaft 315 and 316 therein, respectively. A protrusion 314i is for mounting the head arm 317 swingable thereon. The head carriage also has a small vertical protrusion 314j for assuring smooth moving of the head carriage responding to the rotation of the capstan 312.

The steel band 313 is wound around the capstan 312 by passing one end 313j of the steel band 313 through the oblong aperture 313d, by being embracing with the upper face 307d and the lower face 307f of the steel band fixing piece 307 and by fixing both ends of the steel band to diagonal corners of the head carriage 314. By fixing the leaf spring 318 to a right position by a screw 319, the large width part 313i of the steel band 313, which is at the rear end face and in the recess 314d of the head carriage 314, is bent with a strong force by the pressing part 318e of the leaf spring 318 thereby producing a tension.

The steel band fixing piece 307 has flat shaped round central part 307a and upper and lower extended arms 307c and 307e shaped to have a curvature diameter to fit the outside curvature of the wound steel band 313 or a little larger curvature diameter than the outer face of the wound steel band 313. The central fixing part 307a, which is to be fixed by the screw 329 to the side face of the capstan 312, is shaped in a flat circular shape so as to make a good contact with the head of the screw 319. In this example, for the outside diameter of the wound steel band 313 of 11.0 mm, the upper and lower extended arms 307c and 307e have the inside curvature diameter of 12.0 mm. If the inside curvature diameter of the upper and lower extended arms 307c and 307e are made equal to the outside diameter of the steel band 313, there is a problem that due to inaccuracy or dispersion of the winding working of the steel band 313 around the capstan 312, the inside curvature diameter sometimes becomes smaller than the outside diameter of the wound steel band. In such cases there is a possibility that the steel band 313 does not tightly touch the outside surface of the capstan 312 and causes undesirable slippage of the head carriage motion. That is, the design of the larger curvature diameter of the upper and lower extended arms 307c and 307e of the steel band fixing piece 307 is a practical and useful improvement for a stable and accurate operation of the head carriage 314.

What is claimed is:

1. A driving apparatus for a magnetic head comprising:
    a capstan to be driven by a step motor;
    a head carriage having a read-write head thereon and a recess part on a first face thereof and a second face;
    a steel band which is connected to said head carriage along said first face and said second face of said head carriage and said band being operatively wound around said capstan at a side of said second face, to give linear motion to said head carriage in response to rotation of said capstan, the direction of said linear motion being substantially perpendicular to said first face; and
    a strong spring for pressing one part of said steel band into said recess part.

2. A driving apparatus for a magnetic head in accordance with claim 1, wherein
    said steel band has holes for screw-fixing on said head carriage at one end thereof and another hole for engaging with a protrusion of said head carriage at another end thereof and has at a medium part thereof a fixing hole to be screw-fixed to said capstan and a band fixing piece for regulating said steel band in a predetermined position.

3. A driving apparatus for a magnetic head in accordance with claim 1, wherein
    said strong spring has one hole for screw-fixing at a central part thereof and two holes for positioning and fixing by engagement with two protrusions formed on an end part of said head carriage.

4. A driving apparatus for a magnetic head in accordance with claim 1, wherein
    said strong spring has a bent part to press said steel band into said recess part.

5. A driving apparatus for a magnetic head in accordance with claim 1, wherein
    said steel band has a band fixing piece having two bent parts which abut the top and bottom of said capstan, for preventing undesirable rotation of said steel band when screw-fixing it onto said capstan.

* * * * *